June 19, 1956      F. C. RACKER      2,751,233
COLLAPSIBLE TOW TRUCK
Filed April 5, 1955
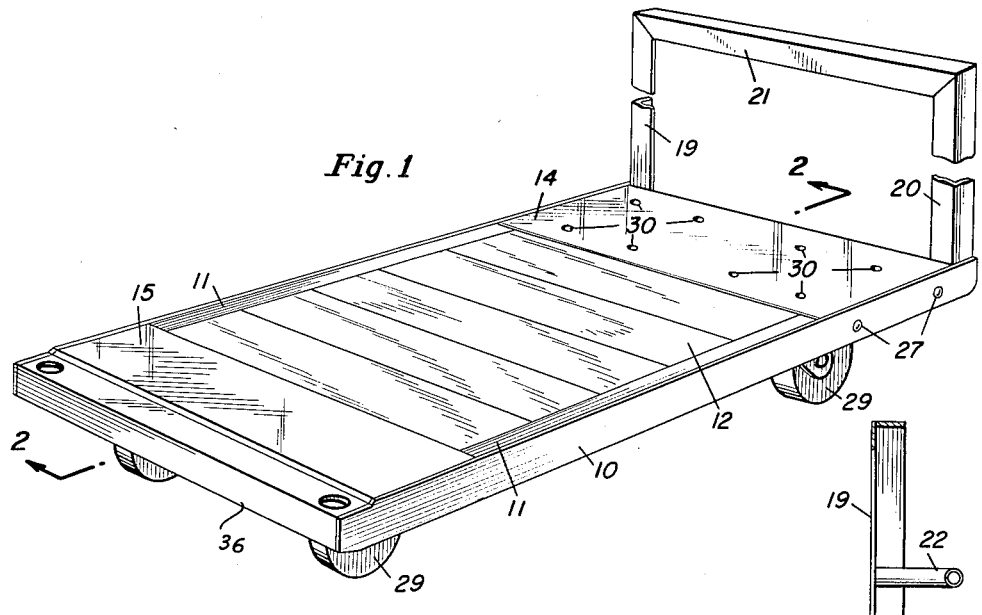
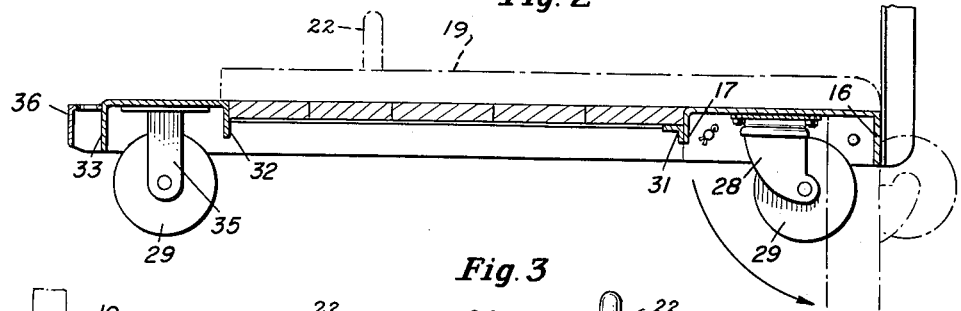
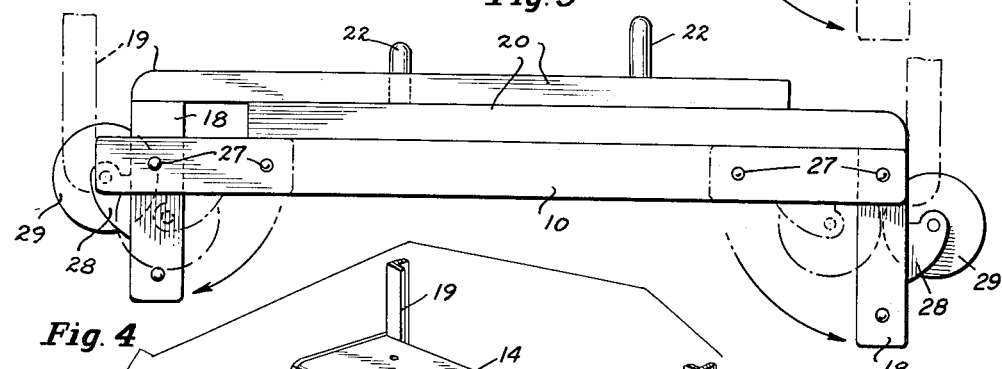
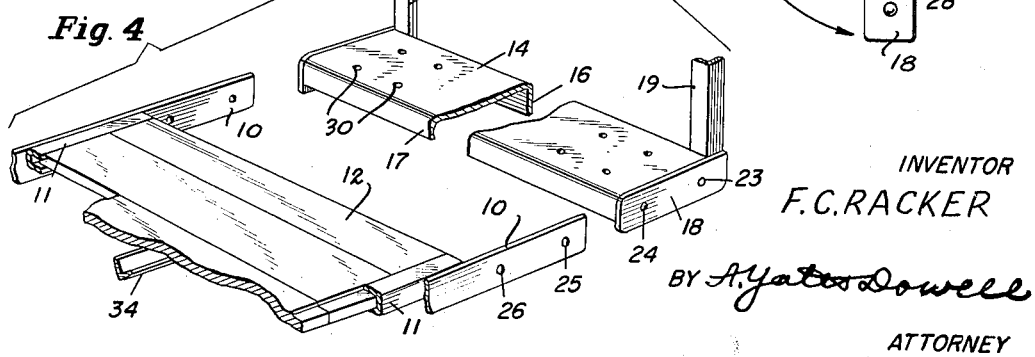
INVENTOR
F. C. RACKER
BY A. Yates Dowell
ATTORNEY

United States Patent Office 2,751,233
Patented June 19, 1956

2,751,233
COLLAPSIBLE TOW TRUCK

Frederick C. Racker, Nashville, Tenn., assignor to The Jakes Foundry Company, Nashville, Tenn., a corporation of Tennessee Application April 5, 1955, Serial No. 499,335

6 Claims. (Cl. 280—41)

This invention relates to the support and movement of commodities and to equipment employed, particularly trucks of the kind that are loaded and allowed to stand motionless until they are engaged or picked up by a power driven conveyor moving at a constant velocity and which picking up action subjects them to excessive shock or strain.

The invention is concerned specifically with industrial trucks having pivoted casters at one end to enable them to be steered and with one or more standard accessories such as blackboards, billboards, chalk trays, or the like, and with trailer hitches and couplers, the latter being permanently attached to the swivel caster ends of the trucks so that they may readily be connected to a moving conveyor located either above or beneath the body of the truck. These trucks of this character have racks at one or both ends and couplers attached thereon for use with the overhead conveyor systems.

Trucks of this character have had rigid upright racks or frames of standard structural shape metal, pipe, tubing or the like and due to the height, a great amount of space has been required making the cost of transportation excessive. This has resulted in a manufacturer in a remote area having difficulty in undertaking to compete with a manufacturer in a given area on account of shipping costs.

It is an object of the invention to provide a tow truck of the desired quality and character but which can be collapsed sufficiently to allow a larger number of trucks to be loaded into a prescribed space so that the cost per unit during shipment, as well as during storage, will be materially reduced, as well as a tow truck with a collapsible rack which can be folded flat down onto the deck surface of the truck without sacrificing the necessary strength and rigidity of the truck when the rack is in upright position during use.

Other objects and advantages of the invention will become apparent from the following description taken in conjunction with the accompanying drawing wherein:

Fig. 1 is a perspective illustrating one application of the invention;

Fig. 2, a section on the line 2—2 of Fig. 1 with the rack in a position of use and also illustrated in collapsed position in dot-and-dash lines;

Fig. 3, a side elevation of a truck with a rack at each end in collapsed position but with dot-and-dash lines illustrating the racks in upright positions; and Fig. 4, a fragmentary detail perspective illustrating the manner in which the front frame member and rack are mounted.

Briefly stated, the invention comprises a truck having a central body portion and front and rear portions each supported by spaced casters with the caster mounts for the front portion pivoted to permit easy steering of the truck. A rack is provided at one or both ends secured in fixed upright relation and by removing the gear of a pair of spaced fasteners the rack can be folded downwardly onto the body of the truck during shipment or storage in order to make it possible for a greater number of units to be stacked in a given area.

With continued reference to the drawing the truck of the present invention comprises side plates 10 and spaced facing U-channels 11 for supporting deck plates 12 which form the deck. The side plates extend a substantial distance beyond the deck and are adapted to have mounted between the same front and rear frame members 14 and 15.

The front frame member 14 comprises substantially an inverted U-shape and has an upper flat portion and front and rear downwardly turned flanges 16 and 17, to the ends of which plates 18 are welded or otherwise attached. The flat portion of member 14 forms a continuation of the deck 12. To the flange 16 at the front of the frame member 14 is mounted a rack consisting of upstanding angle or side bars 19 and 20 connected at their extremities by a cross bar 21, and a pipe or tubular member 22. However, pipe or tubular member 22 also connects the bars 19 and 20 and serves as a handle for the truck. The rack of the truck may be folded down in substantially horizontal position along the deck.

The side plates of the front frame member 14 are provided with front and rear openings 23 and 24 adapted to be disposed in alignment with corresponding front and rear openings 25 and 26 in the side members 10. When the front openings 23 and 25 are in alignment with pivot bolt 27 disposed within such openings and the openings 24 and 26 in alignment with a bolt disposed within such openings, the parts will be held in fixed relation. When the bolt or other fastener is not within openings 24 or 26, the rack may be folded as stated with the flange 17 engaging the ground and forming an immobile support for the truck. Therefore, upon the insertion of the bolt into the openings 24 and 26 the rack will be secured in fixed relation to the body of the truck.

In order to support the front frame of the truck a pair of swivel caster mounts 28 are provided each having a caster 29 and being secured to the member 14 by means of bolts 30 one at each corner of the caster mount. In view of the fact that the front frame member is not permanently secured to the side plates 10, the deck may be reinforced at its front end by means of a transverse angle bar 31 welded or otherwise secured at its ends beneath U-shaped channel members 11.

The rear frame member 15 is provided with a front depending flange 32 and a rear depending flange 33. The ends of these flanges may be welded or otherwise secured to the side plates 10 with the front flange also welded to the ends of the U-shaped side channels 11.

If desired, a central longitudinal brace 34 may connect the depending front flange 32 with the transverse angle bar 31 at the opposite end of the deck, such longitudinal brace 34 being preferably of channel construction for strength and having the edges of the channel in contact with the bottom surface of the deck members or plates 12.

The rear end member 15 may have a pair of rigid caster mounts 35 fixed to its under surface by welding or in any other desired manner and supported on wheels or casters 29. The rear member 15 may be provided with a trailer hitch 36 of any desired character.

It will be apparent from the foregoing that the truck described above consists of relatively few parts, is sturdy, rigid and has a collapsible rack permitting compact arrangement during storage and shipment.

Instead of a truck having a rack only at the front end as illustrated in Figs. 1 and 2, a truck having a collapsible rack at each end may be provided as illustrated in Fig. 3, such racks being identical with the rack at the front end of the machine as shown in Figs. 1 and 2, however, the pivot bolt 27 nearest the rear end of the truck will be located a distance nearer the innermost edge of the frame member for which it forms a supporting pivot, such distance corresponding to the thickness of the front rack so that the racks may lie in parallel relation when they are collapsed.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A truck comprising a deck, facing U-shaped channels receiving opposed edges of said deck within the same, spaced side plates located on opposite sides of said channels and having end portions extending beyond the ends of said channels, front and rear transverse frame members constructed to be disposed in spaced relation at opposite ends of said deck between said side plates, spaced fasteners for connecting one frame member to said side plates and located in substantially the same longitudinal position with regard to each side plate, the fasteners nearest the longitudinal center of each side plate being removable to permit pivotal movement of such frame member during storage and shipment, a rack mounted on said last mentioned frame member and which during storage and shipment can be disposed in collapsed position along said deck, and caster mounts and casters spaced transversely beneath each of said frame members with the caster mounts on the pivoted frame member rotatable about a substantially vertical axis to permit steering of the truck.

2. A truck comprising a deck, spaced side plates having end portions extending beyond the ends of said deck, front and rear transverse frame members constructed to be disposed in spaced relation at opposite ends of said deck between said side plates and having flat portions forming a planar continuation of the deck, spaced fasteners for connecting said frame members to said side plates and located substantially in the same longitudinal position with regard to each side plate, the fasteners nearest the longitudinal center of each side plate being removable to permit pivotal movement of each transverse frame member during storage and shipment, a rack at the end of the truck carried by the frame member capable of pivotal movement to a position overlying the deck, whereby during storage and shipment said rack can be disposed in collapsed position along said deck, and caster mounts and casters spaced transversely on each of said frame members with the caster mounts on said frame member capable of pivotal movement rotatable about a substantially vertical axis to permit steering of the truck.

3. A truck comprising a deck, spaced side plates located on opposite sides of said deck and having end portions extending beyond the ends of said deck, front and rear transverse frame members constructed to be disposed in spaced relation at opposite ends of said deck between said side plates and having flat portions forming a planar continuation of the deck, spaced fasteners for connecting said frame members to said side plates and located substantially in the same longitudinal position with regard to each side plate, the fasteners nearest the longitudinal center of each side plate being removable to permit pivotal movement of each transverse frame member during storage and shipment, a rack attached to one frame member and movable from an upright position to a position overlying the deck, and casters carried by the frame members, whereby during storage and shipment said casters will be moved away from the ground engaging position.

4. A truck comprising a flat deck, U-shaped channels fitted over opposite edges of said deck, an outer side plate along each channel and having end portions extending beyond the ends of said channels, a frame member at each end of said deck secured between said side plates, said frame members having flat top surfaces forming a planar continuation of the deck, casters supporting said frame members, the casters supporting one of said frame members being mounted for angular movement so that the truck may be steered, an upstanding rack on the caster supported frame member, and means pivotally mounting said last-mentioned frame member so that said rack can be collapsed downwardly to reduce the overall height of the truck with said frame member in ground engaging and deck supporting position.

5. A truck comprising an elongated body or deck having a plate at each side extending beyond the deck, a frame member located at each end of said body between said plates and having a flat top surface forming a planar continuation of the deck, one of said frame members being pivotally mounted between said plates on the ends thereof, an upright rack mounted on said pivotally mounted frame member, means for securing said pivotally mounted frame member with said rack in upright position but permitting said frame member to be pivoted to lower said rack to a position overlying the deck, and casters carried by the frame members, whereby during storage and shipment said casters will be moved away from ground engaging position and with said frame member in ground engaging and deck supporting position.

6. A truck as set forth in claim 5, wherein each frame member constitutes an inverted U-shape with its bight portion lying in the plane of the deck and one of its legs engaging the deck when said member is in fixed position and engaging the ground when said member has been pivoted to assume a vertical position.

References Cited in the file of this patent

UNITED STATES PATENTS

| | | |
|---|---|---|
| 2,206,857 | Wagner | July 2, 1940 |
| 2,446,518 | Arnold | Aug. 10, 1948 |
| 2,634,182 | Tretheway | Apr. 7, 1953 |